United States Patent [19]

Weiss

[11] Patent Number: 4,856,007

[45] Date of Patent: Aug. 8, 1989

[54] AXIAL GAS LASER AND PROCESS FOR STABILIZING ITS OPERATION

[76] Inventor: Hardy P. Weiss, IM Seeblick 8821, Hutten, Switzerland

[21] Appl. No.: 138,849
[22] PCT Filed: Mar. 11, 1987
[86] PCT No.: PCT/CH87/00031
§ 371 Date: Dec. 15, 1987
§ 102(e) Date: Dec. 15, 1987
[87] PCT Pub. No.: WO87/05750
PCT Pub. Date: Sep. 24, 1987

[30] Foreign Application Priority Data

Mar. 12, 1986 [CH] Switzerland .................. 1014/86

[51] Int. Cl.⁴ .................................................. H01S 3/13
[52] U.S. Cl. ........................................ 372/29; 372/58; 372/20; 372/59
[58] Field of Search .................. 372/58, 59, 29, 20

[56] References Cited

U.S. PATENT DOCUMENTS

| | | | |
|---|---|---|---|
| 3,471,807 | 10/1969 | Kagan | 372/20 |
| 3,566,304 | 2/1971 | Neusel et al. | 372/59 |
| 4,360,922 | 11/1982 | Kulkarny | 372/59 |
| 4,507,786 | 3/1985 | Dezenberg et al. | 372/59 |
| 4,718,071 | 1/1988 | Steffen | 372/58 |

*Primary Examiner*—Léon Scott, Jr.
*Attorney, Agent, or Firm*—Antonelli, Terry & Wands

[57] ABSTRACT

A method of stabilizing an operation of a continuous axial gas laser including at least one gas flow tube system comprising at least one excitation tube, and a gas flow circulation arrangement connected to the gas flow tube system to generate a gas flow therethrough. The gas flow circulation system generates a timed pulsating gas flow and an output pressure signal having a predetermined frequency spectrum. The flow tube system has a pressure-versus-frequency damping transmission characteristic between an input from the gas flow circulation arrangement and the excitation tube, with the damping varying with a frequency of the pressure pulsations applied to the input. The continuous axial gas laser is stabilized by shifting the predetermined frequency spectrum of the pulsating gas flow generated by the gas circulation arrangement with respect to frequency and the damping transmission characteristic to minimize the pressure pulsations to the excitation tube from the gas flow circulation arrangement. The gas flow circulation arrangement may include a rotary- or piston-type compressor, with the step of shifting of the predetermined frequency spectrum including adjusting an operating speed of the compressor or the number of compression chambers. An injection nozzle injects the gas into the excitation tube and filters pressure pulsations of the gas flow circulation arrangement. A radial fan compressor, an axial fan compressor, a single or multi-stage radial fan compressor, a single of multi-housing radial compressor, an axial blower or an axial compressor may be provided for enabling a shifting of the predetermined frequency spectrum.

25 Claims, 2 Drawing Sheets

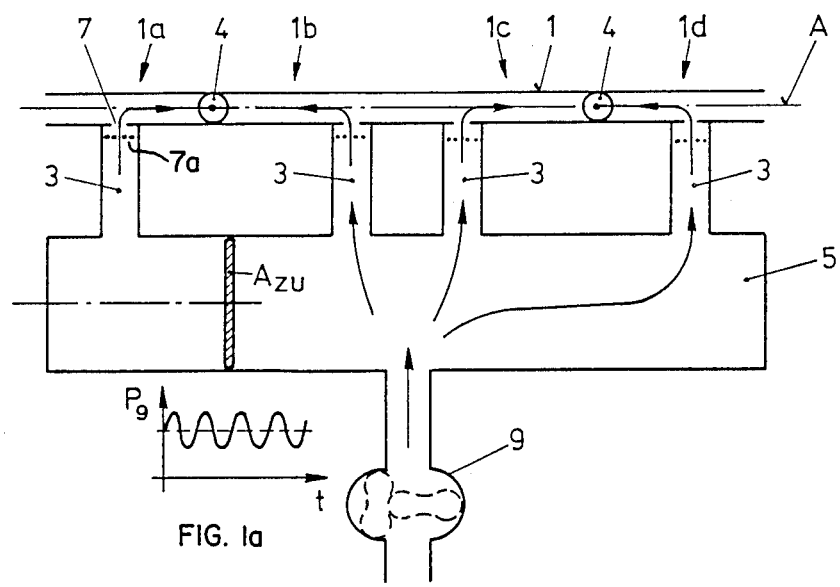
FIG. 1
FIG. 1a
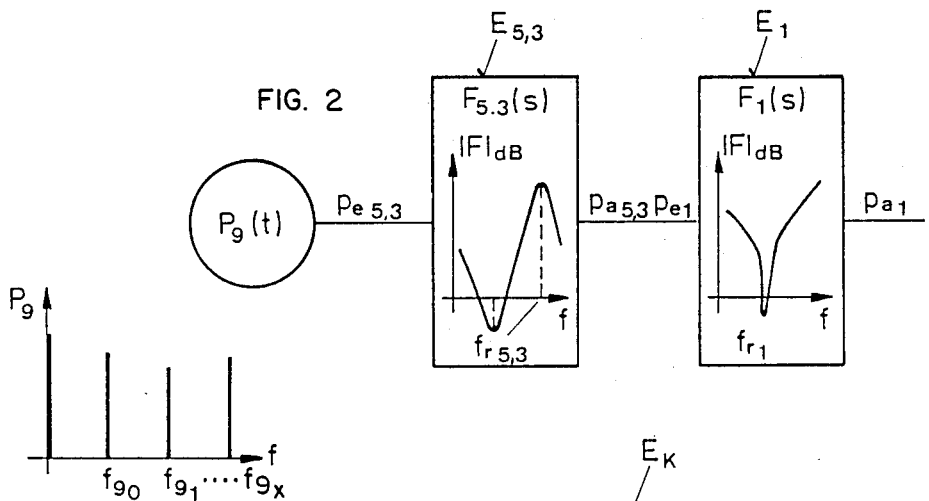
FIG. 2
FIG. 2b
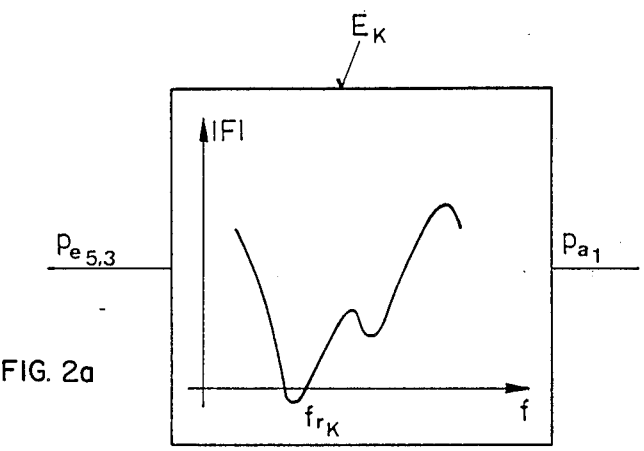
FIG. 2a

AXIAL GAS LASER AND PROCESS FOR STABILIZING ITS OPERATION

BACKGROUND OF THE INVENTION

The present invention relates to a process for stabilizing the operation of an axial gas laser which includes at least one laser excitation tube and at least one gas circulation system, with connecting devices being provided between the gas circulation system, laser excitation system and axial gas laser.

During the operation of axial gas lasers used, for example, to weld longitudinally extending seams on cans in the canning industry, periodically occurring thickenings can frequently be seen on the welded seam as a result of, for example, a phenomena such as pulsations in the laser power.

The aim underlying the present invention essentially resides in minimizing, if not avoiding, the occurrence of periodically occuring thickening in the longitudinally extending weld seams in cans.

In accordance with advantageous features of the present invention, at least portions of the frequencies of pressure curve frequency components produced by pressure pulsations in the gas circulation system as well as resonant frequencies of the load on the circulation system formed at least by the excitation tube and the connection device or devices may be advantageously selected.

Considering an axial gas laser of this type, one must view the gas circulation system essentially as a source of alternating signals which generates pressure at the output side of the system and, for example, in accordance with a number of compression chambers provided as well as rotational speed of the device, the pressure pulsating around an average pressure value at a basic frequency determining by such parameters. Depending on the construction of the gas circulation system, the initial pressure, with purely sinewave pulsations, has a single frequency component with pulsation which differs from a sinusoidal shape additional frequency components corresponding to higher harmonics.

The excitation tube, connecting devices and any additional devices coupled thereto such as, for example, electrical devices for electrical DC or AC excitation of the excitation tube, combine to form a common frequency dependent load impedance which imposes a load on the gas circulation system as a source. As known, mechanical systems can generally be viewed in complete analogy to electrical impedances and, consequently, mechanical, acoustical, electrical and other mixed systems can be treated in a system by looking toward electro-mechanical analogies.

If the general impedance, viewed by the source as a load, such as a transformer, with a frequency-dependent transformer function as given by a Bode diagram, has resonant frequencies which correspond to the basic or higher harmonics of the source pressure curve, a resonant circuit exists which is excited at the resonant frequency so that oscillations in the laser output power can occur and, which, in turn, can lead to the above-noted variations in the thickness of the welded seam. When a Roots blower is used as the gas circulation system, the same frequency is encountered in the thickness fluctuations at the welded seam as the pulsating fluctuations generated at the output side by the blower used. If at least one piston-type compressor is used as the gas circulation system, including rotary compressors, Roots compressors, and screw compressors, it is proposed that the basic harmonic of the pressure curve produced by the number of compression chambers and rotational speed of the compressor provided should be selected to be much higher than at least portions of the resonant frequencies of the load by increasing the number of chambers and/or the rotational speed, especially the less damped resonant frequencies.

If the individual components of the load, electrical system/gas excitation tube/connecting device, are uncoupled from one another, the resonant frequencies of the partial systems can be considered individually, which is much simpler than an overall examination of the total system. As a result, the laser tube and connecting device can now preferably be uncoupled from one another in terms of frequency, by blowing the gas from the connecting device into the laser tube.

The fact that a buffer volume is also provided on the connecting device for the gas, the volume being much greater than the volume amplitudes of the periodic circulation volume pulsations produced by the gas pressure device, causes the pressure fluctuations to be sharply damped with respect to their effect on the laser tube, the large volume acts as a lowpass element. If such a buffer volume is provided, assurance must be given that when two or more gas supply lines are provided for the laser tube and/or the laser tube arrangement, the gas supply to all supply lines is the same. In addition, the buffer volume is provided in a chamber which is axially parallel to the laser tube, from which n lines with $n \geq 2$ extending radially to the laser excitation tube and dimensioned so that the cross-sectional area of a chamber $A_{zu}$ and the line cross-sectional areas $L_{Lm}$ as well as coefficient of resistance $\zeta_{Ln}$ have the following relationship:

$$A_{zu} \geq \sum_{1}^{N} A_{Lm} \frac{4}{\sqrt{1 + \zeta_{Ln}}}$$

Preferably, according to the present invention, the coefficient of resistance $\zeta_n$ is thus increased in the lines n by providing grids, honeycomb structures or the like.

One of the axial gas lasers according to the present invention for achieving the goal desired hereinabove is characterized by the fact that a turbo compressor is provided as a gas circulation system, which turbo compressor generates practically no pressure pulsations on the output side.

It is also possible in accordance with the present invention to provide an axial gas laser with at least one laser excitation tube, at least one gas circulation system and connecting devices between the gas circulation system and the laser excitation tube, with the connecting devices comprising at least one buffer chamber between the circulation system and excitation tube, and with the volume of the at least one buffer chamber being much greater than amplitudes of the circulation volume pulsations caused by the gas circulation system.

It is also possible for the gas circulation system of the present invention to comprise at least one turbo compressor.

The above and other objects, features and advantages of the present invention will become more apparent from the following description when taken in connection with the accompanying drawings.

BRIEF DESCRIPTION OF THE DRAWINGS

FIG. 1 is a schematic diagram of an axial gas laser system constructed in accordance with the present invention;

FIG. 1a is a graphical illustration of a pressure time graph and an output side of a gas circulation system of an axial gas laser system of FIG. 1;

FIG. 2 is a diagram of the axial gas laser system of FIG. 1 depicting a frequency behavior thereof;

FIG. 2a is a depiction of purely qualitative possible amplitude patterns for transformation functions;

FIG. 2b is a graphical illustration of a resultant pressure curve and an output side of a gas circulation system depicting a basic harmonic and a higher harmonic.

DETAILED DESCRIPTION OF THE INVENTION

Figure 3:
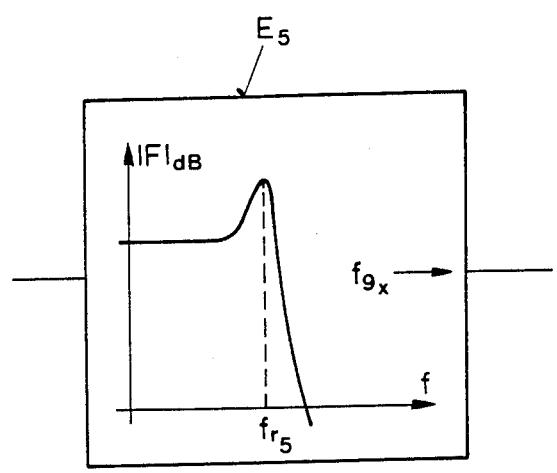
FIG. 3 is a qualitative explanation of a frequencyamplitude pattern of a chamber in the gas laser system of FIG. 1.

Referring now to the drawings, wherein like reference numerals are used throughout the various views to designate like parts and, more particularly, to FIG. 1, according to this figure, an axial gas laser according to the present invention includes an excitation tube arrangement 1 with electrodes (not shown) for electrical AC or DC excitation, and with a longitudinal axis of the laser being designated by the dot-dashed line A. The excitation tube arrangement 1 is supplied through excitation tube sections generally designated by the reference numerals 1a, 1b, 1c, 1d with a gas supply line 3, and with one gas guide 4 provided for two excitation tube sections 1a–1b and 1c–1d. The gas supply lines 3 extend from a buffer chamber 5, elongated longitudinally, located preferably at least nearly axially parallel to the laser axis A. The transfer of gas from the gas supply lines 3 to the excitation tube arrangement 1 is accomplished through openings 7 having a reduced crossection, diaphragms or nozzles, and/or additional flow resistances such as a grid 7a. The buffer chamber 5 is pressurized through a gas circulation system 9 by, for example, a Roots compressor.

If the circulation system used has a number m of compression chambers and is operated at rotational speed r as shown schematically in FIG. 1a a pressure/time graph $p_9 = F(t)$, the gas circulation system 9 is shown on the output side, there is a pulsation of output pressure $p_9$ with a basic frequency according to the following equation:

$$f_{90} = \frac{1}{2\pi \cdot m \cdot r}$$

The gas circulation system 9 of the axial gas laser of FIG. 1 generally produces a pulsating pressure $p_9(t)$ on the output side of the system 9, with the resultant pressure curve, as shown schematically in FIG. 2b, having a basic harmonic corresponding to $f_{90}$ and higher harmonic $f_{9x}$. The system which loads the gas circulation system 9, the connecting devices with the buffer chamber 5, the gas supply lines 3, and excitation tube arrangement 1, with all of the provided mechanical, electrical, optical, etc. devices, composed of pressure transmission, units schematically in FIG. 2 by $E_{5,3}$, $E_1$, etc., transmits the pressure changes at the input side with a transformation function which is a function of the frequency according to F(s), shown in FIG. 2 as the amplitude patterns of the Bode diagram, at the output. As known, such transformation functions F(s) with the s as the Laplace operator, are defined as the ratio of the Laplacian output value to the Laplacian input value, in other words, for example $$\left| \frac{\tilde{p}_a}{\tilde{p}_e} \right|_{5.3} = F_{5.3}(s)$$

FIG. 2a shows purely qualitatively possible amplitude patterns for the transformation functions, usually expressed in dB. The frequency curves of the individual sections $E...E_k$ have section-specific resonant frequencies $f_r$. If two or more such units E, as is required for constructing a unit according to FIG. 1, are combined, the result is a combined transformation block $E_K$. When freedom of the blocks from feedback is not guaranteed, the combined block $E_K$ has additional resonant frequencies $f_{rK}$ which do not correspond to the resonant frequencies of the individual blocks. If one of the resonant frequencies $f_{rK}$ of the combined unit $E_K$, which also include resonant frequencies at least close to the $f_r$ of the individual blocks, lies on one of the harmonic frequencies $f_{9x}$ of gas circulation system 9 of the source, unit $E_K$ acts as an oscillating circuit excited to resonance, with the resultant pressure fluctuations on the output side in this frequency becoming large in dependence on the quality of the circuit. These pressure fluctuations on the output side in discharge section result in pulsations in the laser output power, for example, with the effects described above.

The solution to this problem lies in the following measures, used individually or in combination; namely, a selection of excitation frequencies, different from the lowresonant frequencies, or vice versa; an isolation of individual units from one another or creation of freedom from feedback; and/or a designing or construction of the transformation blocks with desirable frequency responses, for example, as low pass elements, for deliberately influencing the combined frequency response through damping at dangerous resonance points $f_r$, $f_{rK}$.

A first measure for eliminating this problem is to shift the frequency components $f_{9x}$, created by gas circulation system 9, in such a way that they lie as far as possible from resonant frequencies $f_{rK}$, $f_r$ of combined unit $E_K$. According to the expression given above for the basic harmonic $f_{90}$ of the resultant output pressure pulsations in gas circulation system 9, this is accomplished by increasing the number of compression chambers m provided and/or increasing the rotational speed r of the compressor provided. In particular, when using a turbocompressor (cf. W. Opitz, Turbocompressors, in "Taschenbuch fuer den Maschinenbau" ("Handbook of Mechanical Engineering"), 14th Edition, Springer Verlag Berlin), practically no pressure pulsations are produced at the output of the compressor, so that the use of such turbocompressors is very well suited for this purpose. In such compressors, both the number of compression chambers m and the rotational speed r can be made very high. In particular, such compressors can also be very easily controlled, so that the optimum rotational speed r can be determined experimentally with the load connected, without having to take the negative effects on power into account.

If now, according to FIG. 1, as a second measure, as the sole measure, or in conjunction with the measures already described and possibly those yet to be described, the buffer chamber 5 is connected downstream from gas circulation system 9, with volume $V_5$ of the buffer chamber 5 being much greater than the circulation volume-amplitude values $\Delta V$ for the basic harmonic of the pressure pulsations, this buffer chamber 5, because of its large volume as shown in FIG. 3, acts as a lowpass element with a limiting frequency with a resonance overshoot which is much lower than conventional excitation frequencies. The result is a sharp damping of the load at frequencies $f_r$, $f_{rK}$, so that the load on the blower $E_5$, $E_{5,3}$, $E_1$ is sharply damped at the excitation frequencies, especially the basic harmonic pulsation frequency $f_{90}$ of the blower. This measure, namely providing a buffer chamber 5, either by itself or in addition to the above-described measures for the gas circulation system or measures to be described below, results in a significant reduction in laser power fluctuation.

If a buffer chamber 5, as shown in FIG. 1, is provided which feeds several lines 3 to excitation tube arrangement 1, all lines 3 provided whose number is indicated by n, where $n \geq 2$ must have a uniform flow of gas through them. This is accomplished if the following is at least approximately true:

$$A_{zu} \geq \sum_{1}^{n} A_{Lm} \frac{4}{\sqrt{1 + \zeta_{Ln}}}, \quad (1)$$

wherein:

$A_{zu}$ = is the cross-sectional area of chamber 5, perpendicular to its lengthwise axis B;

$A_{Lm}$ = cross-sectional area of the radial connecting line number with m = 1, 2... n;

$n \geq 2$ = number and quantity of gas supply lines 3 under consideration;

$\zeta_{Ln}$ = coefficient of gas supply resistance of lines 3 in question.

Preferably, the coefficient of resistance $\zeta_{Ln}$ of lines 3, FIG. is increased by at least one flow resistance element, such as a grid 7a, a honeycomb structure, etc.

If this condition is met, uniform gas flow into excitation tube arrangement 1 is ensured through all n gas supply lines 3.

In this way also, the laser power is stabilized in the above fashion in excitation tube arrangement 1, for example, by preventing turbulence.

Another measure which can be used independently or combined with others, and which prevents oscillations in laser power from developing, is to introduce an insulating element between connecting devices 3,5 and excitation section 1. According to FIG. 1, this is accomplished by nozzles 7. Especially when operating above the critical level, in other words, with a ratio of the pressure on the chamber side to the pressure on the excitation section side of more than 1.8, the nozzle 7 acts as a lowpass element with an extremely low limiting frequency. The very low pressure variations on the input side do have effects on the output side, while more rapid pressure changes do not appear on the output side. This is true for both transformation directions, and also in buffer chamber 5, so that frequency decoupling or insulation is accomplished.

By using one or more of the measures outlined above it is possible to eliminate oscillation phenomena in laser output power. The frequency curves of the individual subsystems and combined systems can be calculated at least approximately. It is simple to measure the frequency curves of the load by, for example, applying sinusoidal pressure fluctuations of constant amplitude and variable frequency on the input side and determining the pressure fluctuations that appear at the output side. Identification of the transformation behavior of transformation blocks using selected input parameter curves such as interval, pulse, sine, etc. is also known.

An example of the relationship of equation (1) in above and for calculating low-resistant frequencies $f_r$ is set forth hereinbelow.

Assuming an excitation tube arrangement 1 constructed in accordance with the present invention with $n = 8$, gas supply lines 3 and a length of 2,000 mm, and assuming that each gas supply line 3 is provided with a grid 7a in the form of a perforated sheet having a coefficient of resistance $\zeta_{Ln} \approx 7$ and corresponding to a perforated sheet with 40% openings, and a buffer chamber 5 with a rectangular cross-section corresponding to an area $A_{zu}$ with edges 60 mm and 140 mm and a diameter of the supply lines 3 being 30 mm, it is possible to determine the area $A_{zu}$ by the following equation:

$$A_{zu} = 60 \cdot 140 = 8,400 \text{ mm}^2.$$

The cross-sectional area $A_{Lm}$ of the lines may be determined as follows:

$$A_{Lm} = \frac{\pi \cdot 900}{4} = 706.9 \text{ mm}^2.$$

From equation (1), the following may be determined:

$$8400 \geq 8 \times \frac{706.9 \cdot 4}{\sqrt{8}} = 7997 \text{ mm}^2 \quad (4)$$

Thus conditions (1) of equation is met, and a uniform gas supply is realized through the eight gas supply lines 3 provided into excitation tube 1.

The excitation tube, because of the known mirror provided on both sides of the excitation tube 1, is considered to be a tube which is enclosed on two sides. Again, assuming excitation tube of 2000 mm in length, the resonant frequencies of the excitation tube can be determined from the following equation:

$$f_r = (k + 1) \frac{c_L}{2l}. \quad (5)$$

The basic harmonic ($k = 0$) with which the speed of sound $c_L$ in the added gas of 600 m/s resulting in the following relationship:

$$f_{ro} = \frac{600 \cdot 10^3}{4 \cdot 2 \cdot 10^3} = 150 \text{ sec}^{-1} = 150 \text{ Hz}. \quad (6)$$

Thus, if a blower is used which produces pressure pulsations on the output side with the basic harmonic of 150 Hz, the excitation tube, which forms a resonator with a resonant frequency of 150 Hz, will be excited at its resonant frequency, and the corresponding laser power pulsations will be observed. The blower used must be selected by choosing the rotational speed r and/or the number n of chambers such that any pressure pulsations that appear will have a basic harmonic which is preferably much higher than the 150 Hz mentioned above.

I claim:

1. A process of operating a continuous axial gas laser including at least one gas flow tube system through which a gas flows, said gas flow tube system comprising at least one excitation tube along which the flowing gas is electrically excited, and gas flow circulation means connected to said gas flow tube system to generate a gas flow therethrough, said gas flow circulation means generating a gas flow pulsating in time and providing for an output pressure signal which has a predetermined frequency spectrum, said flow tube system having a pressure-versus-frequency damping transmission characteristic between an input from said gas flow circulation means and said excitation tube, the damping of which varies with a frequency of pressure pulsations applied to said input, the process comprising stabilizing the operation of the continuous axial gas laser flow including shifting said predetermined frequency spectrum of said pulsating gas flow generated by said gas flow circulation means with respect to frequency and relative to frequency of said damping transmission characteristic to minimize pressure pulsations transmitted to said excitation tube from said gas flow circulation means.

2. The process of claim 1, wherein said gas flow circulation means includes a compressor, and wherein the shifting of said predetermined frequency spectrum includes adjusting an operating speed of said compressor.

3. The process of claim 2, wherein the compressor includes a rotary compressor.

4. The process of claim 2, wherein the compressor includes a piston-type compressor.

5. The process of claim 1, wherein said gas flow circulation means includes a plurality of compression chambers, and wherein the shifting of said predetermined frequency spectrum includes suitably selecting said number of compression chambers.

6. The process of claim 1, wherein said damping transmission characteristic has at least one resonant frequency band of low damping, said frequency spectrum having at least one spectrum line of a predetermined value at a predetermined frequency, further comprising the step of shifting of said predetermined frequency of said one spectrum line out of said resonance frequency band of said damping transmission characteristic.

7. The process of claim 1, wherein said shiftng includes providing a turbo compressor as said gas flow circulation means.

8. The process of claim 7, wherein said compressor includes a radial fan compressor.

9. The process of claim 7, wherein said compressor includes an axial fan compressor.

10. The process of claim 7, wherein said compressor includes a single or multi-stage radial fan compressor.

11. The process of claim 7, wherein said compressor includes a single or multi-housing radial compressor.

12. The process of claim 7, wherein said compressor includes an axial blower.

13. The process of claim 7, wherein said compressor includes an axial compressor.

14. A process for operating a continuous axial gas laser including at least one gas flow tube system through which a gas is flowing, said flow tube system comprising at least one excitation tube along which the flowing gas is electrically excited, and further comprising gas flow circulation means connected to said gas flow tube system for generating a gas flow therethrough, said gas flow circulation means generating a gas flow pulsating in time providing for an output pressure signal with a predetermined frequency spectrum, said gas flow tube system having a pressure versus frequency transmission damping characteristic between an input from said gas flow circulation means and said excitation tube which varies with frequency of pressure pulsations applied to said input, the process comprising stabilizing the operation of the axial gas laser including introducing a pressure pulsation filter means between said gas circulation means and said excitation tube to damp transmission of said pulsating in time by said gas flow circulation means from said gas circulation means to said excitation tube.

15. The process of claim 14, comprising the step of providing nozzle means to inject said gas into said excitation tube, said nozzle means filtering pressure pulsations generated by said flow generator means from being transmitted to said excitation tube.

16. The process of claim 14, wherein a buffer volume chamber is interconnected between said gas flow circulation means and said excitation tube, said buffer volume chamber having a volume greater than gas volume pulsations caused by said pressure pulsation at the output of said gas circulation means.

17. The process of claim 16, wherein said buffer volume chamber is located substantially parallel to a longitudinal axis of said excitation tube and is connected by a plurality of radially extending lines to said excitation tube, a cross-sectional area of said buffer volume chamber perpendicular to said axis of said excitation tube satisfies the following relationship:

$$A_{zu} \geq \sum_{1}^{n} A_{Lm} \frac{4}{\sqrt{1 + \zeta_{Ln}}},$$

wherein:
$A_{zu}$ = cross-sectional area of said buffer volume chamber;
$A_{Lm}$ = cross-sectional area of a radial connecting line numbering from m = 1... n;
$\zeta_{Ln}$ = coefficient of resistance of a radial connecting line numbering from the number 1 to n; and
n = total number of radial connecting lines, with n ≧ two.

18. The process of claim 17, wherein the coefficient of flow resistance of at least one of said connecting lines is increased by a grid means disposed within said line.

19. A continuous axial gas laser comprising at least one gas flow tube system through which a gas is flowing, said flow tube system comprising at least one excitation tube along which the flowing gas is electrically excited, gas circulation means connected to said gas flow tube system for generating a gas flow therethrough, said gas flow circulation means comprising at least one turbo compressor means for generating a gas flow through said excitation tube of said gas flow tube system substantially without pulsation in time to minimize pressure pulsations transmitted to said excitation tube from said gas circulation means.

20. A continuous axial gas laser including at least one gas flow tube system through which a gas is flowing, said flow tube system comprising at least one excitation tube along which the flowing gas is electrically excited, gas circulation means connected to said gas flow tube system for generating a gas flow therethrough, said gas circulation means generating a gas flow pulsating in time and providing for gas volume pulsations of predetermined amplitudes within said gas flow tube system, and pressure pulsation filtering means disposed between said gas circulation means and said excitation tube to damp transmission of said pulsating in time of said gas flow generated by said gas circulation means from said gas circulation means to said excitation tube.

21. An axial gas laser according to claim 20, comprising at least one buffer chamber means interconnected between said gas circulation means and said excitation tube, said buffer chamber means having a volume greater than volume pulsations caused by said gas circulation means.

22. An axial gas laser according to claim 21, wherein said buffer volume chamber is located at least substantially parallel to a longitudinal axis of said excitation tube and further comprises connecting lines extending substantially radially from said buffer chamber to said excitation tube, and wherein a volume of the buffer chamber is determined in accordance with the following relationship:

$$A_{zu} \geq \sum_1^n A_{Lm} \frac{4}{\sqrt{1 + \zeta_{Ln}}},$$

wherein:
- $A_{zu}$ = cross-sectional area of said buffer chamber perpendicular to said longitudinal axis of said excitation tube;
- $A_{Lm}$ = cross-sectional area of a radial line numbering from m=1... n;
- $\zeta_{Ln}$ = flow resistance coefficient of that line; and
- n = total number of connecting lines provided, with n ≧ two.

23. An axial gas laser according to claim 22, wherein at least one said radially disposed connecting lines comprises at least one grid disposed within the line to increase the flow resistance of that line.

24. An axial gas laser according to claim 20, wherein said gas circulation means includes a turbo compressor.

25. An axial gas laser according to claim 20, wherein said pulsation filtering means comprises nozzle means disposed upstream of said excitation tube.

* * * * *

(12) REEXAMINATION CERTIFICATE (4638th)
United States Patent
Weiss

(10) Number: US 4,856,007 C1
(45) Certificate Issued: Sep. 10, 2002

(54) AXIAL GAS LASER AND PROCESS FOR STABILIZING ITS OPERATION

(75) Inventor: Hardy P. Weiss, Hutten (CH)

(73) Assignee: PRC Corporation, Landing, NJ (US)

Reexamination Request:
No. 90/005,133, Nov. 20, 1998

Reexamination Certificate for:
Patent No.: 4,856,007
Issued: Aug. 8, 1989
Appl. No.: 07/138,849
Filed: Dec. 15, 1987

(22) PCT Filed: Mar. 11, 1987
(86) PCT No.: PCT/CH87/00031
§ 371 (c)(1),
(2), (4) Date: Dec. 15, 1987
(87) PCT Pub. No.: WO87/05750
PCT Pub. Date: Sep. 24, 1987

(30) Foreign Application Priority Data

Mar. 12, 1986 (CH) .............................. 1014/86

(51) Int. Cl.$^7$ ................................. H01S 3/13
(52) U.S. Cl. ...................... 372/29; 372/58; 372/20; 372/59
(58) Field of Search ......................... 372/58, 59, 29, 372/20, 55, 61

(56) References Cited

U.S. PATENT DOCUMENTS

| | | | | | |
|---|---|---|---|---|---|
| 4,274,065 | A | * | 6/1981 | Garscadden et al. | 372/58 |
| 4,321,558 | A | * | 3/1982 | Zappa | 372/58 |
| 4,351,052 | A | * | 9/1982 | Sasaki et al. | 372/58 |
| 4,709,372 | A | * | 11/1987 | Rando et al. | 372/58 |

FOREIGN PATENT DOCUMENTS

FR 2558994 * 8/1985

OTHER PUBLICATIONS

The M.W. Kellogg Co., Design of Piping Systems, 2d ed. (New York, John Wiley & Sons, 1956), pp. 277–283, 333–335.

* cited by examiner

Primary Examiner—Leon Scott, Jr.

(57) ABSTRACT

A method of stabilizing an operation of a continuous axial gas laser including at least one gas flow tube system comprising at least one excitation tube, and a gas flow circulation arrangement connected to the gas flow tube system to generate a gas flow therethrough. The gas flow cirultion system generates a timed pulsating gas flow and an output pressure signal having a predetermined frequency spectrum. The flow tube system has a pressure-versus-frequency damping transmission characteristic between an input from the gas flow circulation arrangement and the excitation tube, with the damping varying with a frequency of the pressure pulsations applied to the input. The continuous axial gas laser is stabilized by shifting the predetermined frequency spectrum of the pulsating gas flow generated by the gas circulation arrangement with respect to frequency and the damping transmission characteristic to minimize the pressure pulsations to the excitation tube from the gas flow circulation arrangement. The gas flow circulation arrangement may include a rotary- or piston-type compressor, with the step of shifting of the predetermined frequency spectrum inclucing adjusting an operating speed of the compressor or the number of compression chambers. An injection nozzle injects the gas into the excitation tube and filters pressure pulsations of the gas flow circulation arrangement. A radial fan compressor, an axial fan compressor, a single or multi-stage radial fan compressor, a single or multi-housing radial compressor, an axial blower or an axial compressor may be provided for enabling a shifting of the predetermined frequency spectrum.

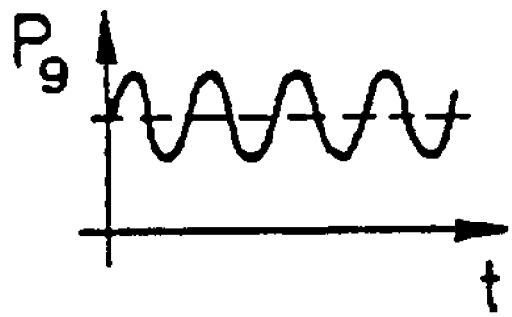

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–19 is confirmed.

Claim 20 is determined to be patentable as amended.

Claims 21–25 dependent on an amended claim, are determined to be patentable.

New claims 26–41 are added and determined to be patantable.

20. A continuous axial gas laser including at least one gas flow tube system through which a gas is flowing, said flow tube system comprising at least one excitation tube along which the flowing gas is electrically excited, *said excitation tube having a pressure-versus-frequency damping characteristic,* gas circulation means connected to said gas flow tube system for generating a gas flow therethrough, said gas circulation means generating a gas flow pulsating in time and providing for gas volume pulsations of predetermined amplitudes within said gas flow tube system, and pressure pulsation filtering means disposed between said gas circulation means and said excitation tube to damp transmission of said pulsating in time of said gas flow generated by said gas circulation means from said gas circulation means to said excitation tube *relative to frequency of said damping characteristic*.

26. *A process of operating a continuous axial gas laser including at least one gas flow tube system through which a gas flows, said gas flow tube system comprising at least one excitation tube along which the flowing gas is electrically excited, and gas flow circulation means connected to said gas flow tube system to generate a gas flow therethrough, said process comprising the steps of:* a) *generating a gas flow pulsating in time which provides for an output pressure signal having a predetermined frequency spectrum;* b) *providing a pressure-versus-frequency damping transmission characteristic between an input from said gas flow circulation means and said excitation tube; and* c) *shifting said predetermined frequency spectrum of said pulsating gas flow generated by said gas flow circulation means relative to said damping transmission characteristic to minimize pressure pulsations transmitted to said excitation tube from said gas flow circulation means.*

27. *The process of claim 26, wherein said gas flow circulation means includes a compressor, and wherein said shifting includes adjusting an operating speed of said compressor.*

28. *The process of claim 27, wherein the compressor is a rotary compressor.*

29. *The process of claim 27, wherein the compressor is a piston-type compressor.*

30. *The process of claim 26, wherein said gas flow circulation means includes a plurality of compression chambers, and wherein said shifting is effected by the number of said compression chambers.*

31. *The process of claim 26, wherein said damping transmission characteristic has at least one resonant frequency band of low damping, said frequency spectrum having at least one spectrum line of a predetermined value at a predetermined frequency, further comprising the step of shifting said predetermined frequency of said one spectrum line out of said resonance frequency band of said damping transmission characteristic.*

32. *The process of claim 26, wherein said shifting is effected by providing a turbo compressor as said gas flow circulation means.*

33. *The process of claim 32, wherein said compressor is a radial fan compressor.*

34. *The process of claim 32, wherein said compressor is an axial fan compressor.*

35. *The process of claim 32, wherein said compressor is a single or multi-stage radial fan compressor.*

36. *The process of claim 32, wherein said compressor is a single or multi-housing radial compressor.*

37. *The process of claim 32, wherein said compressor is an axial blower.*

38. *The process of claim 32, wherein said compressor is an axial compressor.*

39. *A continuous axial gas laser comprising at least one gas flow tube system through which a gas is flowing, said flow tube system comprising at least one excitation tube in which an electrical discharge is applied to the flowing gas, and at least one gas flow circulation means for generating a gas flow through said gas flow tube system, wherein said gas flow circulation means generates a gas flow pulsating in time, wherein said gas flow circulation means provides for an output pressure signal with a predetermined frequency spectrum, wherein said gas flow tube system has a pressure-versus-frequency transmission damping characteristic between said gas flow circulation means and said excitation tube, and wherein said predetermined frequency spectrum of said pulsating gas flow generated by said gas flow circulation means is shifted by means selected from the group consisting of a buffer chamber positioned between said gas circulation means and said excitation tube, adjustment of an operating speed of said gas circulation means, an insulating element between said gas circulation means and said excitation tube, and said gas flow circulation means comprising a plurality of compression chambers, for minimizing pressure pulsations relative to said damping transmission characteristic to minimize pressure pulsations transmitted to said excitation tube from said gas flow circulation means.*

40. *The continuous axial gas laser according to claim 39, further comprising the step of providing nozzle means to inject said gas into said excitation tube, said nozzle means filtering pressure pulsations generated by said flow generator means from being transmitted to said excitation tube.*

41. *The continuous axial gas laser according to claim 39, wherein a buffer volume chamber is interconnected between said gas flow circulation means and said excitation tube, said buffer volume chamber having a volume greater than gas volume pulsations caused by said pressure pulsation at the output of said gas circulation means.*

\* \* \* \* \*